US007031696B2

(12) United States Patent
Gerrits et al.

(10) Patent No.: US 7,031,696 B2
(45) Date of Patent: Apr. 18, 2006

(54) TIMEKEEPER WITH AUTOMATIC TIME SETTING AND TIME SETTING METHOD FOR SAME

(75) Inventors: Johannes F. Gerrits, Cortaillod (CH); Christian Piguet, Neuchatel (CH); Yan Brand, Quebec (CA)

(73) Assignee: CSEM Centre Suisse d'Electronique et de Microtechnique SA-Recherche et Developpement, Neuchatel (CH)

( * ) Notice: Subject to any disclaimer, the term of this patent is extended or adjusted under 35 U.S.C. 154(b) by 133 days.

(21) Appl. No.: 10/475,081

(22) PCT Filed: Apr. 24, 2002

(86) PCT No.: PCT/EP02/04537

§ 371 (c)(1),
(2), (4) Date: Oct. 23, 2003

(87) PCT Pub. No.: WO02/088849

PCT Pub. Date: Nov. 7, 2002

(65) Prior Publication Data

US 2004/0127234 A1 Jul. 1, 2004

(30) Foreign Application Priority Data

Apr. 27, 2001 (EP) .................................. 01401093

(51) Int. Cl.
*H04M 3/42* (2006.01)
*H04Q 7/22* (2006.01)

(52) U.S. Cl. ...................... 455/414.1; 368/47; 455/102

(58) Field of Classification Search .................. 368/47
See application file for complete search history.

(56) References Cited

U.S. PATENT DOCUMENTS

| | | | | |
|---|---|---|---|---|
| 3,895,486 | A | 7/1975 | Hammer et al. | 58/23 R |
| 4,232,192 | A | 11/1980 | Beex | 179/1 FS |
| 4,426,735 | A | 1/1984 | Kasperkovitz | 455/222 |
| 4,582,434 | A * | 4/1986 | Plangger et al. | 368/46 |
| 5,003,621 | A * | 3/1991 | Gailus | 455/209 |
| 5,507,024 | A * | 4/1996 | Richards, Jr. | 455/260 |
| 5,745,503 | A * | 4/1998 | Kuusinen | 714/752 |
| 6,751,163 | B1 * | 6/2004 | Miyakawa | 368/46 |

FOREIGN PATENT DOCUMENTS

| | | |
|---|---|---|
| EP | 0 399 482 | 11/1990 |
| EP | 0 624 959 | 11/1994 |
| EP | 0 682 302 | 11/1995 |
| GB | 2 238 438 | 5/1991 |
| GB | 2238438 A * | 5/1991 |
| WO | 90/14721 | 11/1990 |
| WO | 96/36301 | 11/1996 |

* cited by examiner

*Primary Examiner*—William Trost
*Assistant Examiner*—Ariel Balaoing
(74) *Attorney, Agent, or Firm*—Jacobson Holman PLLC

(57) ABSTRACT

A timekeeper equipped with a radio reception device capable of decoding Radio Data System (RDS) information and including a time base, a display for displaying time data supplied by the time base, and an adjustment control for correcting the time data. The radio reception device includes a frequency locking loop for delivering RDS type data derived from a RDS spectrum received on a high-frequency carrier; and a controller which, on the basis of the delivered RDS type data, controls the adjustment control to ensure time setting of the timekeeper. The timekeeper is portable and the radio reception device rejects the spectrum received from a frequency modulated transmitter supplying RDS data, except for the frequency band containing RDS type data.

11 Claims, 2 Drawing Sheets

TIMEKEEPER WITH AUTOMATIC TIME SETTING AND TIME SETTING METHOD FOR SAME

This is a nationalization of PCT/EP02/04537 filed Apr. 24, 2002 and published in French.

BACKGROUND OF THE INVENTION

1. Field of the Invention

The present invention relates to the radiosynchronization of timekeepers which can be set to the correct time automatically by a radio data system (RDS) radio broadcast transmitter.

2. Description of the Related Art

Radio stations operating in the frequency modulation (FM) band and in accordance with the RDS standard transmit a time signal containing the time and the date coded in a CT portion of a frame transmitted with the audio signal of the station.

FIG. 1 of the appended drawings shows the standardized baseband spectrum transmitted by stations of the above type, which frequency modulates a carrier P whose frequency is specific to the transmitter station. It can be seen that the spectrum includes a first monophonic band B1 from 0 to 15 kHz and which contains all of the right and left audio channel signals to be transmitted. A pilot frequency FP of 19 kHz is used to decode the stereo information, while a second stereophonic band B2 from 23 to 53 kHz contains the difference between the right and left audio signals. Finally, a third band B3 contains the RDS data. This band of the spectrum is centered on 57 kHz with a bandwidth from 54.5 to 59.5 kHz.

The patent GB 2 238 438 discloses a timekeeper equipped with an RDS radio reception device comprising:

- a timebase,
- means for displaying time data supplied by said timebase, and
- means for correcting said time data,
- and in which said RDS radio reception device comprises:
  - means for delivering RDS data derived from an RDS spectrum received on a high-frequency carrier; and
  - control means which, on the basis of the delivered RDS data, control said correction means to ensure time setting of the timekeeper.

The RDS radio reception device described in the patent previously cited uses the timing data from the RDS frame contained in band B3 of the FIG. 1 spectrum for ensuring the radiosynchronization of a clock provided as a timekeeper in the receiver. However, as the reception device is primarily intended for listening to audio broadcasts by stations to which it can be tuned, it must include reception and sound reproduction circuits that require a relatively large quantity of energy to function.

The reception device must therefore have a high-capacity energy source of which only a very small portion is used for radiosynchronization. In the example provided in the patent in question, which relates to a radio receiver for automobile vehicles, this kind of supply is naturally readily available in the form of the onboard power supply network of the vehicle, with the result that the quantity of energy required for radiosynchronization is not a problem for the designer.

The same would apply in the case of an RDS receiver taking the form of the usual kind of radio with radiosynchronization of a built-in clock, as the dimensions of this kind of radio can accommodate batteries of sufficient capacity to power all of the circuits of the receiver, including the radiosynchronization circuits, for a time period that is acceptable for a user. Such radios can incidentally also be powered by the mains or by a vehicle power supply network.

In the field of clocks and watches, the energy storage capacity available in a timekeeper such as a wristwatch is an ongoing problem that designers attempt as much as possible to solve by minimizing the consumption of all the components of the timekeeper to give it the longest possible battery life from a battery whose size is compatible with that of the timekeeper. Transposing the concept disclosed in the patent previously cited to a timekeeper that is worn by the user, with the aim of radiosynchronizing it using RDS data, thus runs into the problem of supplying electrical energy, as a timekeeper such as a wristwatch can obviously not accommodate an energy source of sufficient capacity for the combination of an RDS HF radio receiver and radiosynchronized clock circuits to be able to operate for a reasonable time period.

A typical wristwatch battery operates at a voltage of 1.3 V and provides a maximum current of the order of only 1 mA, preferably with a battery life of about a year or even more.

Also known in the art are radiosynchronized watches including a radio receiver tuned to a station transmitting a time signal on a long-wave carrier, typically at a frequency from 40 to 80 kHz. These stations are exclusively dedicated to radiosynchronization, and because of their transmit frequency and power, they cover a territory encompassing more than one time zone. The time to which the watch equipped with suitable reception means is synchronized therefore does not necessarily correspond to the time zone in which the user of the watch is located. Also, the consumption associated with the radiosynchronization function in a watch of this kind is relatively low and in any case compatible with a normal period of use of the energy source of the watch. The reason for this is that the low radio frequency carrying the synchronization information allows the use of means whose power consumption is low. Thus this prior art concept cannot provide a satisfactory solution to the problem of producing a timekeeper that is worn by the user and is radiosynchronized by transmissions from HF radio stations transmitting time data in accordance with the RDS standard.

SUMMARY OF THE INVENTION

An object of the invention is to provide a timekeeper equipped with an RDS radio reception device for radio synchronizing it using time data of broadcasts by an RDS station of any kind received by the RDS radio reception device, the power consumption of the timekeeper being compatible with the energy storage capacity of the batteries usually used in timepieces.

The invention therefore consists in a timekeeper as defined hereinabove characterized in that the timekeeper is designed to be worn, and the radio reception device further includes means for rejecting the spectrum received from a frequency modulated transmitter supplying RDS data, except for the frequency band containing the RDS data.

Thanks to the above features, the internal time of the timekeeper can be corrected as a function of the local time supplied by an RDS transmitter, the consumption of the radio reception portion of the timekeeper being minimized because only the band of frequencies onto which the timing data is modulated is extracted from the demodulated band of frequencies of the HF carrier received.

Furthermore, as an RDS transmitter has a short range, much less than the geographical region covered by a time zone, and as RDS stations are widespread in all geographical regions, the timekeeper according to the invention will in all circumstances adopt the local time of the RDS transmitter that, in the geographical region in which the watch is located, has the transmission power necessary and sufficient for good reception. The change of time zone or the changeover from wintertime to summertime or vice-versa is therefore automatic with the timekeeper according to the invention.

In the present description, the expression "local time" refers to the time data provided by the RDS portion of the FM signal and that indicates the date and the GMT universal time accompanied by the offset value corresponding to the geographical location of the transmitter station.

According to one preferred feature of the invention, said radio reception device includes a frequency locking loop in the feedback branch of which is inserted a band stop filter blocking said band of frequencies containing the RDS data.

According to other beneficial features of said timekeeper:

it comprises RDS data decoding means adapted to decode only local time data in said RDS data;

said control means comprise first memory means for storing the internal time data supplied by said time base, second memory means for storing local time data decoded from RDS data received from at least one frequency modulation transmitter, and analyzer means for comparing the local time data to the internal time data and for correcting the time of the timekeeper if the local data and the internal data are different.

The invention also provides a method of setting a timekeeper to the correct time by radiosynchronization, consisting of:

searching for the transmission signal of a frequency modulation transmitter whose spectrum contains RDS data, demodulating the RDS data and decoding the local time data contained in said RDS data, comparing the internal time of said timekeeper to the local time data decoded in this way, and where applicable, adjusting the internal time of said timekeeper if said internal time differs from said decoded local time data, which method is characterized in that:

said timekeeper is adapted to be worn, and it also rejects the baseband audio spectrum received from said transmitter, except for the band of frequencies containing the RDS data.

According to other advantageous features of the method:

it is executed at times separated by predetermined time periods and consists in interrupting the reception of said transmission signal during said predetermined time periods;

it consists in receiving the transmission signal containing RDS data from a first frequency modulation transmitter, extracting first local time data from said signal, comparing said first local time data with the internal time of said timekeeper, in the event of any discrepancy between the first local time data and the internal time, receiving at least a second transmission signal containing RDS data from a second frequency modulation transmitter, extracting from said second transmission signal second local time data, comparing the second local time data to the first local time data, and setting the time of said timekeeper to cancel said discrepancy only if the first local time data is equal to the second local time data;

if said internal time differs from said local time data by one entire hour or a plurality of entire hours, the method corrects only the hours information in said timekeeper;

it consists in analyzing the evolution of the difference between said internal time and said local time data and correcting the rate convergence of said timekeeper if said difference indicates a systematic error over several consecutive operations of comparing said internal time and said local time data.

BRIEF DESCRIPTION OF THE DRAWINGS

Other features and advantages of the present invention will become apparent in the course of the following description, which is given by way of example only and with reference to the appended drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 2:
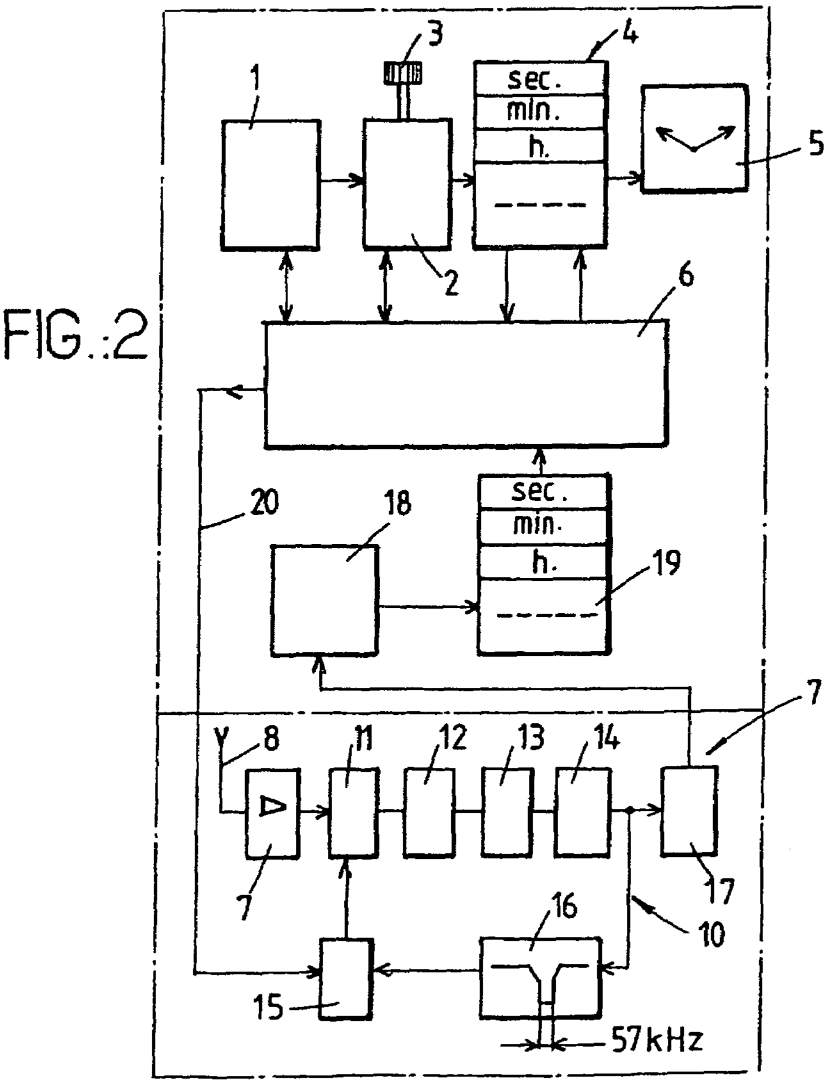
FIG. 2 is a simplified diagram of a timekeeper worn by the user and radiosynchronized in accordance with the invention.

FIG. 2 shows a timekeeper radiosynchronized in accordance with the invention, preferably taking the form of a wristwatch, and including a timebase 1 supplying time data. The time data is fed to time setting means 2 enabling manual adjustment of the timekeeper by means of a crown ring mechanism 3. The time data is loaded into memory means 4 and fed to a display device 5. The memory means 4 contain changing seconds, minutes, hours and other time data such as the day, the date, the year, etc. This data is referred to hereinafter as "internal data". It corresponds to the "internal time" of the timekeeper.

All the means which have just been described are well known in the art of clock and watchmaking and therefore need not be described in detail. They may exist in very many variants, all of which are also well known in the art. For example, the display device 5 can be an analog or digital device or combine both types of display. Other time indication functions can also be provided, for example the day and the date, a stopwatch function, a countdown function, etc. All of these means are managed for example by a microcontroller 6.

The timekeeper that is worn by the user also includes an RDS radio reception device 7. An antenna 8 capable of picking up the frequency modulation band of FM stations transmitting RDS information applies a received carrier signal to a low-noise amplifier 9 whose output signal is transmitted to a frequency locking loop 10. The antenna 8 can take the form described in EP 0 399 482, for example.

The frequency locking loop 10 includes a mixer 11, an intermediate frequency amplifier and filter circuit 12, an oversampling circuit 13, a frequency modulation demodulator 14, a voltage-controlled local oscillator 15, and a band stop filter 16 in the feedback branch of the frequency locking loop, the local oscillator 15 being looped back to the mixer 11.

Apart from the filter 16, the frequency locking loop 10 can be similar to that described in U.S. Pat. No. 4,426,735, for example. The oversampling circuit 13 can be that described in the patent EP 0 624 959.

The filter 16 passes all of the demodulated frequency spectrum except for the band of frequencies standardized for transmission of RDS information. Consequently, the filter 16 does not pass the frequency band from 54.5 to 59.5 kHz, centered on the frequency of 57 kHz. It can be constructed as explained in "Electronic Filter Design Handbook" by A. B. Williams and F. J. Taylor, edited by McGraw-Hill, Inc, New York, USA.

Figure 1:
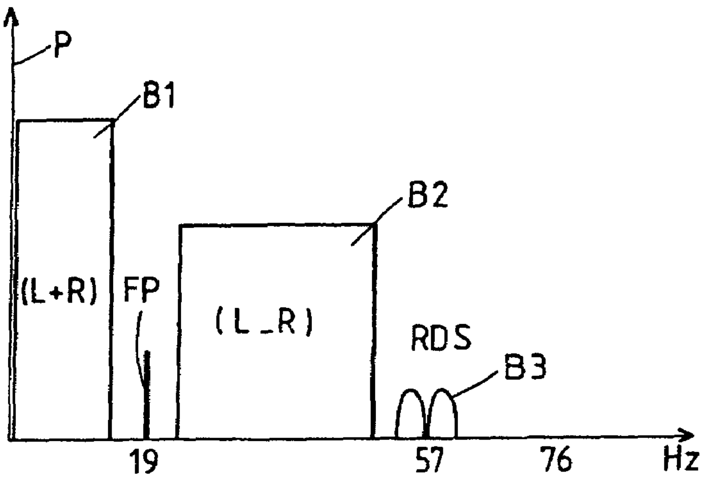
FIG. 1, already described, is a diagram representing the normalized baseband spectrum of an FM radio transmission including an RDS signal.

Thanks to the presence of the filter 16, the frequency locking loop 10 attenuates all the frequencies of the spectrum modulated onto the carrier of the transmitter station except for the RDS band B3 (FIG. 1), which will therefore appear in demodulated form at the output of the demodulator 14. This is also connected to an RDS demodulator 17 in which the RDS information is demodulated and sent on to a decoding circuit 18. The latter is designed to extract from the RDS information the time data representing the time of a local RDS radio station in the reception area in which the timekeeper equipped as just described is located. In other words, the receiver device 7 rejects the spectrum of the demodulated band contained in the received radio signal, except for the band of frequencies in which the frame portion CT of the RDS information is coded.

Accordingly, the radio reception device 7 of the timekeeper according to the invention has no circuits for reproducing audio information contained in the received signal, so that its consumption can be limited to a strict minimum compatible with the usual service life required of a watch battery.

The local time data supplied by the decoder circuit 18 is fed into memory means 19. The memory means 4 and 19 are connected to the microcontroller 6 which controls them in the manner described hereinafter. The time data contained in the memory 19 changes and is referred to herein as "local data". It corresponds to a "local time" of the transmitter picked up at a given time.

Accordingly, receiving the "internal" time determined by the timebase 1 and the "local" time contained in the RDS information received by radio via the radio reception device 7, the microcontroller 6 can be programmed to implement a strategy for controlling the internal time and, where applicable, setting the timekeeper to the correct time.

In an advantageous variant, the microcontroller 6 can also be used to monitor the change over time of differences between the internal time and the local time, and if this change shows a systematic rate error of the timekeeper, command a rate correction. A timekeeper provided with this kind of correction means is described in U.S. Pat. No. 3,895,486.

Figure 3:
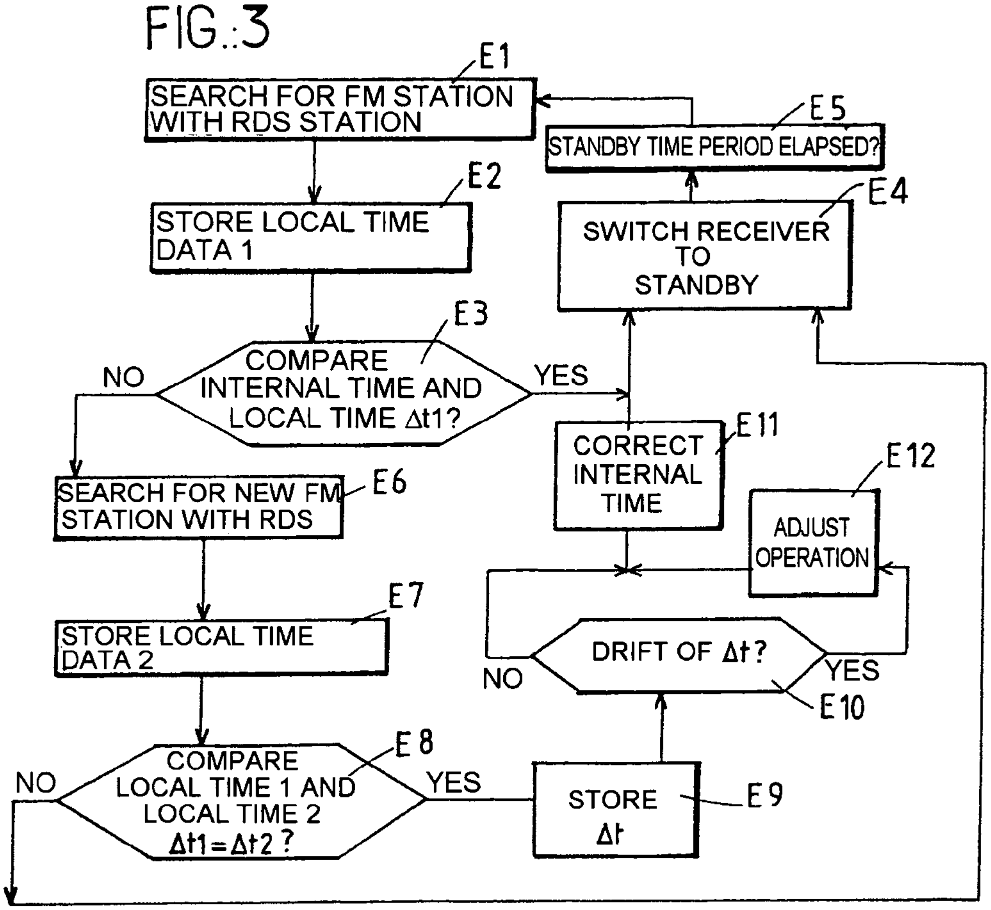
FIG. 3 is a flowchart illustrating the behavior of the timekeeper according to the invention.

FIG. 3 shows one example of this kind of strategy.

To monitor the time of the timekeeper, the first step executed is the step E1 of searching for a transmitter providing a frequency modulation radio transmission including an RDS signal. To command a search, the microcontroller 6 applies an appropriate signal to the local oscillator 15 via a connection 20, and the search can be executed by varying the tuning frequency in steps of 100 kHz, for example. A transmitter is retained if the level of the received signal exceeds a predetermined value sufficient to assure correct detection of the RDS signal.

As soon as the above kind of transmitter has been found, the demodulated RDS signal appears at the output of the demodulator 17. The corresponding signal is applied to the decoder 18 and the local time data is placed in the memory means 19 (step E2).

Step E3 consists of comparing the current internal data placed in the memory means 4 to the decoded local data placed in the memory means 19. If they coincide, the internal time of the timekeeper corresponds to the local time of the transmitter in question, it is assumed that the timekeeper is indicating the correct time, and no action is undertaken.

The microcontroller 6 preferably commands the switching of the receiver 7 to a standby mode to save energy (step E4).

The microcontroller 6 is preferably programmed so that the receiver 7 is energized again after a predetermined time period (step E5) so that the internal time can be checked again. The time period between two successive checks on the internal time is preferably adjustable by means of the adjustment control 2, the time period and its modification being appropriately displayed on the display device 5, where applicable. It is also possible to provide in addition to or in place of this automatic control a manual control time checking facility that can be triggered at the will of the user of the timepiece, for example by means of a function assigned for this purpose to the crown ring mechanism 3 and to the time setting device 2.

If the internal time does not correspond to the local time in step E3, it is naturally possible that the timekeeper is not set to the correct time, but it is also possible that the transmitter that has been found is indicating the wrong time. This is why, in step E6, a new transmitter search is carried out. This search takes place under the same conditions as when executing the step E3.

As soon as a new transmitter is found, in step E7, the local time data supplied by that transmitter is decoded and placed in the memory means 19. In step E8 the microcontroller 6 compares the local time supplied by the previous transmitter and the time from the second transmitter that has just been decoded.

If the two time values coincide, it can be concluded that the internal timer is wrong and that the local time data supplied by the two transmitters in succession is accurate.

The microcontroller 6 then commands the storage in memory of the difference Δt between the local time and the internal time in step E9.

If, on the other hand, the local times of the two transmitters as established during the steps E2 and E7, respectively, do not coincide, it is necessary to assume that neither transmitter has the correct time. The microcontroller 6 preferably then commands switching of the receiver 7 to the standby mode (step E4), as a new check on the time can be carried out after expiration of the standby time period.

In the case represented, it is assumed that the timekeeper has a coherent rate function whereby the microcontroller 6 is able to adjust the rate of the timebase 1 if it is subject to any drift, as previously mentioned. The method described is used to correct the rate if, for example, a systematic error in the rate of the timekeeper caused by drift is found.

Accordingly, in the example described, in step E10 a test is carried out to verify if the values Δt obtained successively, at regular time intervals, during the consecutive checking process, increase or decrease systematically. If not, during a step E11, the timekeeper is updated by correcting the internal time by the value Δt.

Of course, in the absence of said coherent rate function, the microcontroller 6 can correct the internal time as soon as a difference Δt is detected (step E9).

During setting of the timekeeper to the correct time (step E11), it is possible to correct not only the time, but also the date (day, month, year). The method according to the invention can therefore be used to reset the timekeeper as a function of the time zones in which it is worn, the change being effected as and when the time zones are crossed, for example during a journey. It is then relatively unimportant if the next time zone happens to be offset by a half-hour relative to the preceding one, as is the case for some time zones, setting to the correct time also being effected in this case. Of course, if the offset is of one entire hour or several entire hours, it is sufficient to correct only the internal data for the hours and the hours display.

If the result of the step E10 test is in the affirmative, the microcontroller 6 adjusts the rate convergence (step E12) by operating on the timebase 1 in a manner that is known in the art before proceeding to the time setting step E11.

It is clear to the person skilled in the art that radiosynchronization as just described is particularly beneficial in timekeepers worn by the user, such as wristwatches, in which energy is supplied by a low-capacity storage battery recharged by a generator operated by movement of the wearer. Watches of this kind stop quickly if they are not worn. The method according to the invention not only sets the watch to the correct time when it is put back on, but also corrects other time data such as the day, the date and the year.

The method according to the invention also proves very effective for all timekeepers powered by a battery. After changing the battery, the correction of its time data is then automatic and accurate.

As already indicated hereinabove, if, after comparing the internal time and the local time, only the hour values are different, the microcontroller 6 can decide either to change from wintertime to summertime, or vice-versa, or to change time zone because the wearer of the timekeeper has gone from one time zone to another.

Figure 4:
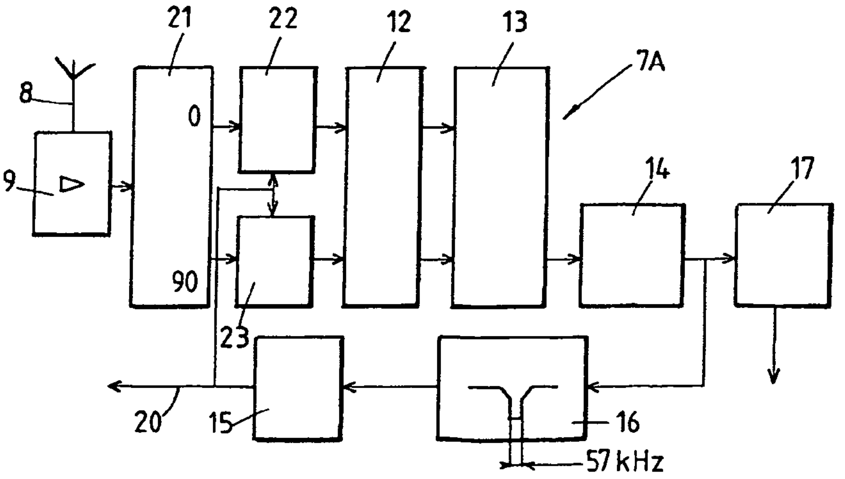
FIG. 4 shows a different embodiment of the radio reception device of the timekeeper according to the invention.

FIG. 4 shows a different radio reception device 7A which, in addition to circuits similar to those of FIG. 2, for which the same reference numbers are used, comprises a phase-shifter 21 connected to the output of the wideband amplifier 9. A first received modulated carrier signal, which has not been phase-shifted, is fed to a first mixer 22, and a second received modulated carrier signal, which has been phase-shifted 90°, is fed to a second mixer 23. The outputs of the two mixers 22 and 23 are connected to the intermediate frequency amplifier and filter circuit 12.

In the foregoing description, the expression "timekeeper" worn by the user must be interpreted in a wide sense. Thus is applies not only to wristwatches in particular, but also to any timekeeper equipped with a low-capacity energy source, such as travel alarm clocks or the like.

It is also clear that the method as described in particular with reference to FIG. 3 lends itself to many variants, as a function of the correction strategies adopted.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method of setting a timekeeper to the correct time by radiosynchronization, comprising the steps of:

searching for the transmission signal of a frequency modulation transmitter whose spectrum contains RDS data;

receiving a first transmission signal containing RDS data from a first frequency modulation transmitter;

rejecting baseband audio spectrum received from said first transmitter except for the band of frequencies containing the RDS data;

demodulating the RDS data and decoding first local time data from said first signal;

comparing the internal time of said timekeeper to the decoded first local time data;

in the event of any discrepancy between the first local time data and the internal time, receiving at least a second transmission signal containing RDS data from a second frequency modulation transmitter;

rejecting baseband audio spectrum received from said second transmitter except for the band of frequencies containing the RDS data;

demodulating and decoding second local time data from said second transmission signal;

comparing the second local time data to the first local time data;

setting the time of said timekeeper to cancel said discrepancy only if the first local time data is equal to the second local time data; and said timekeeper being adapted to be worn during use.

2. The method according to claim 1, wherein said method is executed at times separated by predetermined time periods and includes interrupting the reception of said transmission signal during said predetermined time periods.

3. The method according to claim 1, wherein if said internal time differs from said local time data by one entire hour or a plurality of entire hours, the method corrects only the hours information in said timekeeper.

4. The method according to claim 1, further comprising the step of analyzing the evolution of the difference between said internal time and said local time data and correcting the rate convergence of said timekeeper if said difference indicates a systematic error over several consecutive operations of comparing said internal time and said local time data.

5. A timekeeper comprising:

a timebase having internal time data;

a display for displaying time data supplied by said timebase;

a time setting mechanism for correcting said time data;

a radio reception device configured to deliver radio data system (RDS) data derived from an RDS spectrum received from a frequency modulated transmitter supplying the RDS data except for the frequency band containing the RDS data;

an RDS decoder configuerd to receive the RDS data delivered from said radio reception device and to decode only local time data in said RDS data;

a controller which, on the basis of the delivered RDS data, controls said time setting mechanism to ensure time setting of the timekeeper, said controller including, a receiver for receiving a first transmission signal containing RDS data from a first frequency modulation transmitter;

an analyzer configured to extract first local time data from said first signal and to compare said first local time data with the internal time data supplied by said timebase;

said receiver receiving a second transmission signal containing RDS data from a second frequency modulation transmitter in the event of any discrepancy between the first local time data and the internal time data; and said analyzer configured to extract second local time data from said second transmission signal, compare the second local time data to the first local time data, and set the time of said timekeeper to cancel said discrepancy only if the first local time data is equal to the second local time data; and said timekeeeper configured to be worn during use.

6. The timekeeper according to claim 5, wherein said radio reception device includes a frequency locking loop that attenuates all of the frequencies of the modulated spectrum except for the RDS frequency band.

7. The timekeeper according to claim 6, wherein a feedback branch of said frequency locking loop has a band stop filter that blocks said RDS frequency band from passing such that said RDS frequency band is output from an FM demodulator of said frequency locking loop to an RDS demodulator within the radio recepiton device, said RDS demodulator being coupled to said RDS decoder.

8. A timekeeper according to claim 5, wherein said controller further includes a first memory for storing the internal time data supplied by said time base, and a second memory for storing local time data decoded from the RDS data received from said frequency modulation transmitters.

9. The timekeeper according to claim 5, wherein said timekeeper is a wristwatch.

10. A method of setting a timekeeper to the correct time by radiosynchronization, comprising the steps of:

receiving by said timekeeper a first transmission signal of a first frequency modulation transmitter whose spectrum contains RDS data, said timekeeper being adapted to be worn;

rejecting baseband audio spectrum received from said first transmitter except for the band of frequencies containing the RDS data;

demodulating the RDS data and extracting first local time data from said first signal;

comparing said first local time data with internal time of said timekeeper;

in the event of a discrepancy between the first local time data and the internal time, receiving by said timekeeper at least a second transmission signal of a second frequency modulation transmitter containing RDS data;

rejecting baseband audio spectrum received from said second transmitter except for the band of frequencies containing the RDS data;

demodulating the RDS data and extracting second local time data from said second signal;

comparing said second local time data with said first local time data; and setting the time of said timekeeper to cancel said discrepancy only if the first local time data is equal to the second local time data.

11. The method according to claim 10, wherein said method is executed at times separated by predetermined time periods and includes interrupting the reception of said transmission signals during said predetermined time periods.

* * * * *